United States Patent [19]

Westlake

[11] 4,043,214

[45] Aug. 23, 1977

[54] SPROCKET, GEAR OR PULLEY WITH INTERCHANGEABLE RIM

[76] Inventor: Glen Edgar Westlake, 403 Bent Crescent, Richmond Hill, Ontario, Canada

[21] Appl. No.: 676,498

[22] Filed: Apr. 13, 1976

[51] Int. Cl.² .................. F16H 55/12; F16H 55/30
[52] U.S. Cl. ................. 74/243 DR; 74/446; 74/447; 74/448; 74/450; 74/230.3
[58] Field of Search .......... 74/243 DR, 446, 447, 74/448, 449, 450, 230.3

[56] References Cited

U.S. PATENT DOCUMENTS

| 1,325,778 | 12/1919 | Borden et al. ........................ 74/448 |
| 1,384,623 | 7/1921 | Meredith, Jr. ......................... 74/448 |
| 2,230,902 | 2/1941 | Overbey .............................. 74/448 |
| 2,525,516 | 10/1950 | Bergmann et al. ............. 74/243 DR |
| 2,862,399 | 12/1958 | Wald, Jr. .............................. 74/448 |
| 2,972,903 | 2/1961 | Lee ....................................... 74/447 |
| 3,082,637 | 3/1963 | Paxton ........................... 74/243 DR |
| 3,162,057 | 12/1964 | Burrell ........................... 74/243 DR |
| 3,186,247 | 6/1965 | Burrell ................................. 74/447 |
| 3,225,616 | 12/1965 | Whitehead ............................ 74/448 |
| 3,651,708 | 3/1972 | Müller ................................. 74/447 |

FOREIGN PATENT DOCUMENTS

| 3,300 | 2/1903 | United Kingdom .................. 74/447 |

*Primary Examiner*—Samuel Scott
*Assistant Examiner*—Allan R. Burke

[57] ABSTRACT

A sprocket, gear or pulley having an interchangeable peripheral portion for replacement. The device has a hub with an axial boss, an annular member having teeth or a groove along its outer rim and located concentrically on the boss, and a cap to hold the annular member immovable on the boss. The annular member may be segmented. The inner rim of the annular member and the boss may be threaded or splined for interengagement.

8 Claims, 5 Drawing Figures

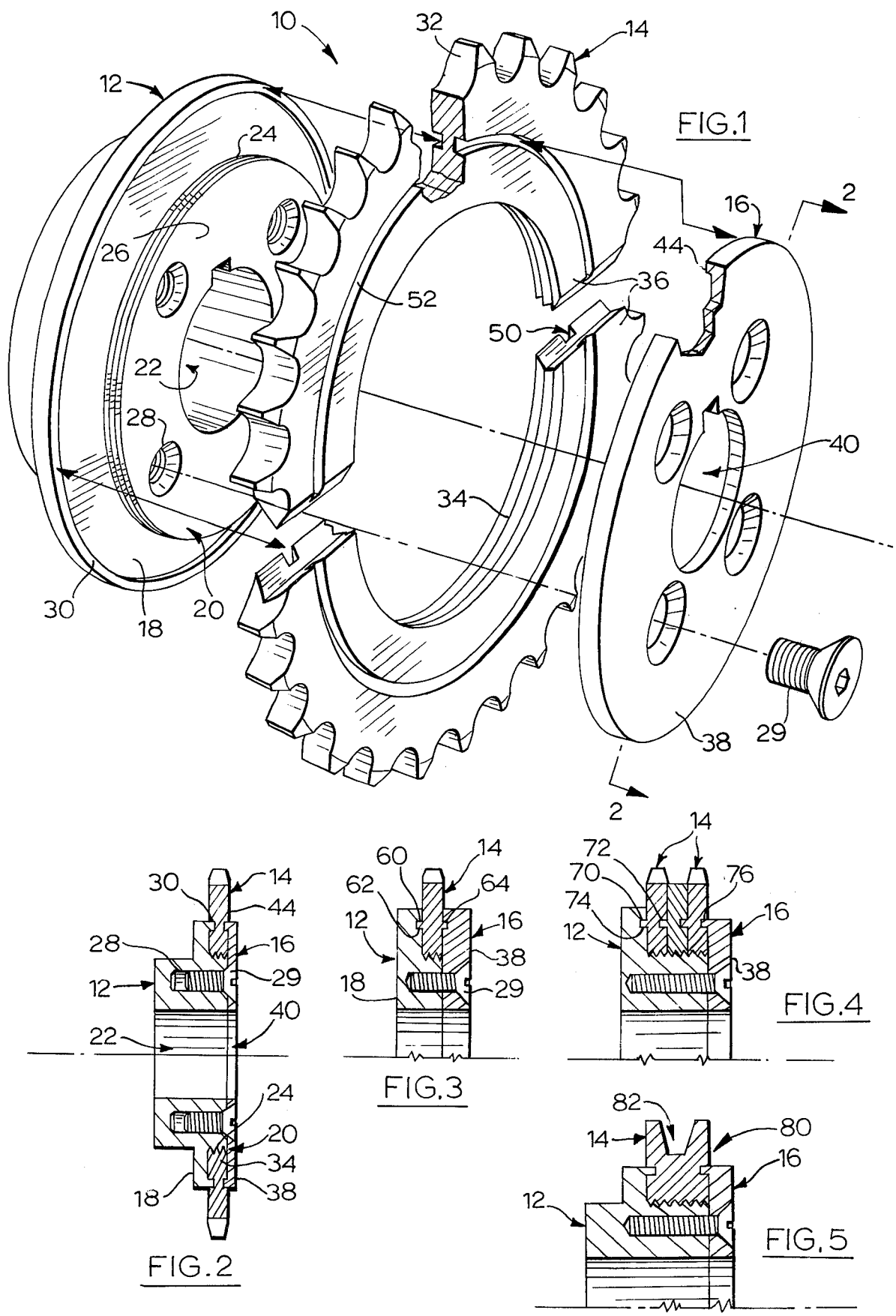

SPROCKET, GEAR OR PULLEY WITH INTERCHANGEABLE RIM

This invention relates to sprockets, gears and pulleys.

Sprocket, gear or pulley wheels are made in various diameters and pitches to meet particular requirements. When the teeth on a sprocket wheel become worn or broken, or when the groove of a pulley wheel becomes worn, the wheel must be replaced which causes undue delays in production output while a replacement is sought and machined. Even when a replacement is readily available it may still be necessary to dismantle the apparatus of which the wheel is a part, to remove the wheel from the shaft on which it is mounted.

Gears with replaceable rims have been devised but the rims are locked on the hub only by bolts which must take the shear stresses created by the forces imparted to the gear.

It is an object of the present invention to provide a sprocket, gear or pulley wheel assembly having a replaceable rim and having interlocking means allowing the rim to grip the hub.

An example embodiment of the invention is shown in the accompanying drawings in which:

FIG. 1 is an exploded perspective view of a sprocket;

FIG. 2 is a cross-sectional view taken along line 2—2 of FIG. 1;

FIG. 3 is a view similar to FIG. 2 showing an alternate embodiment of the sprocket of FIG. 1;

FIG. 4 is also a view similar to FIG. 2 showing another alternate embodiment of the sprocket of FIG. 1; and FIG. 5 is a view similar to FIG. 2 showing a pulley.

The example embodiment shown in FIGS. 1 and 2 of the drawings consists of a sprocket 10 having a hub 12, an annular member 14 and a holding means in the form of a cap 16.

Hub 12 comprises a planar circular plate member 18 with a concentric cylindrical boss 20 projecting axially from at least one side of the plate member. Boss 20 has an axial aperture 22 to accomodate a keyed shaft (not shown) and circumferential threads 24 on its outer surface of revolution. The face 26 of boss 20 has a plurality of threaded holes 28 to receive bolts 29. The outer rim of plate member 18 carries a flange 30 projecting normally from the plane of the plate member in the direction of boss 20.

Annular member 14 is planar with the outer rim carrying radial teeth 32 and the inner rim having threads 34 for engagement with threads 24 of boss 20 on hub 12. Annular member 14 is sectioned to provide a pair of segments 36.

Holding means or cap 16 comprises a planar disc 38 having an axial aperture 40 larger than, or the same size as, aperture 22 in boss 20 of hub 12. A plurality of apertures 42 receive bolts 29 to attach disc 38 removably to boss 20. Disc 38 carries a flange 44 projecting normally from the plane of the disc in the direction of hub 12.

Each face of annular member 14 has an annular groove 50 and 52 to receive flanges 30 and 44 of hub 12 and cap 16 respectively when segments 36 engage boss 20, as seen in FIG. 2 of the drawings.

To assemble the example embodiment, segments 36 are placed on boss 20 of hub 12 to interengage threads 34 and 24 respectively and to have flange 30 on plate member 18 received in groove 50. Cap 16 is then placed against boss 20, with flange 44 received in groove 52 of annular member 14, and fixed on the boss by bolts 29. Segments 36 of annular member 14 are held radially in place by flanges 30 and 44.

In use, a chain engaging sprocket 10 initially causes segments 36 of annular member 14 to rotate on boss 20 of hub 12. Interengaging threads 24 and 34 cause segments 36 to lock either against plate member 18 of hub 12 or disc 38 of cap 16, whereupon sprocket 10 rotates as a unit.

When the teeth of annular member 14 become worn or broken the annular member may be replaced by loosening or removing bolts 29 to separate cap 16 from hub 12 whereupon segments 36 may be removed and replaced by new segments.

It will be seen that the teeth of sprocket 10 of the example embodiment may be replaced without removing hub 12 from the shaft on which it is mounted. This is advantageous where the shaft is journalled on both ends and consequently it is difficult or inconvenient to remove from its bearings. Where sprocket 10 is mounted on a stub shaft annular member 14 could be a single unit, i.e. unsegmented, in which case flanges 30 and 44 on hub 12 and cap 16, and grooves 50 on the annular member, would be superfluous.

Although the example embodiment shows annular member 14 sectioned along a diameter, any suitable sectioning may be used to provide any reasonable number of segments. Preferably the annular member is sectioned between the teeth and the cuts are V-shaped in cross-section as seen in FIG. 1.

The flange and groove interlock between annular member 14, hub 12 and cap 16 may be rearranged, for instance as seen in FIGS. 3 and 4 of the drawings. FIG. 3 shows an arrangement in which annular member 14 carries outstanding flanges 60 received in grooves 62 and 64 in plate member 18 and disc 38 respectively. In FIG. 4 a plurality of annular members 14 each has a flange 70 on one face and a groove 72 on the other face, allowing the members to nest. In the embodiment of FIG. 4 plate member 18 has a groove 74 and disc 38 has a flange 76 to interlock with nested annular members 14. For a multiple groove sprocket an annular member 90 without teeth would be interposed between toothed annular members 14 to accomodate a multiple chain.

While the interfitting faces of plate member 18, annular member 14, and disc 38 are planar in the example embodiment but they could be of any suitable configuration, for example conical.

FIG. 5 of the drawings shows use of the invention in the form of a pulley 80. The structure of pulley 80 is the same as that of sprocket 10 except that the outer periphery of annular member 14 has a longitudinal groove 82 in place of teeth.

The example embodiment shows a sprocket. The structure for a gear would be the same except that radial teeth 32 would be different in shape. For a precision gear it may be unacceptable to have a threaded engagement between annular member 14 and boss 20 of hub 12 because of initial slippage. To prevent any slippage boss 20 may be splined parallel to its axis, the spline or splines being engageable with corresponding grooves located in the inner rim of annular member 14.

In an alternate structure of the device hub 12 and annular member 14, or cap 16 and annular member 14, may carry interengaging slot and pin means to prevent the annular member slipping circumferentially on boss 20. For example a pin may project from the face of plate member 18 and engage a slot in annular member 14 and the slot may be convoluted with respect to the axis of the annular member to tighten the annular member on boss 20 when sprocket 10 is rotated. The term "slot" includes a hole or recess and the term "pin" includes a flange or other suitable projecting means. Of course to prevent relative rotation between hub 12 and annular member 14, groove 50 or 52 may be interrupted in their continuity with the mating gap in flange 30 or 44.

Where sprocket 10 is small it may not be suitable to anchor cap 16 to boss 20, in which case bolts 29 could pass through pilot holes in annular member 14 and engage threaded holes 28 located in plate member 18 of hub 12.

As indicated above, one particular advantage of the invention is that the power engagement portion of the sprocket, gear or pulley may be replaced without removing the hub from its mounting. Another advantage is that a sprocket, gear or pulley made in accordance with the invention may be fabricated with a soft hub 12 and cap 16 and a hardened annular member 14, which decreases the cost of manufacture.

The term "power transmission engagement means" is intended to include any means on the outer rim of annular member 14 which will engage other means for the transfer of mechanical power, for example sprocket teeth or gear teeth or a groove to accomodate a pulley belt.

I claim:

1. A sprocket, gear or pulley having a replaceable peripheral portion, comprising:
    a hub having an axial, cylindrical boss circumferentially threaded on its outer surface;
    an annular member having mechanical power transmission engagement means along the outer rim thereof and threaded along the inner rim thereof for engagement with the boss; and
    means removably secured to the hub to hold the annular member immovable therebetween, the annular member and the hub having interlocking annular flange and groove means and the annular member and the holding means having interlocking annular flange and groove means, whereby the annular member is retained immovably in engagement with the hub.

2. A device as claimed in claim 1 in which holding means comprises a cap bolted to the hub.

3. A device as claimed in claim 2 in which the cap is bolted to the boss.

4. A device as claimed in claim 1 in which the annular member is sectioned to provide a plurality of arcuate segments.

5. A device as claimed in claim 4 in which the abutting ends of the contiguous arcuate segments are now planar in cross section.

6. A device as claimed in claim 1 in which the power transmission engagement means comprises a longitudinal groove engageable with an endless belt.

7. A device as claimed in claim 6 in which the interlocking flange and groove means are arranged whereby a plurality of nesting annular members are held on the boss.

8. A device as claimed in claim 1 in which the power transmission engagement means comprises radial teeth engageable with an endless chain or a gear.

* * * * *